United States Patent [19]

Clemmings et al.

[11] Patent Number: 5,620,732
[45] Date of Patent: Apr. 15, 1997

[54] METHOD OF MAKING ICE CREAM

[75] Inventors: John F. Clemmings, Parsippany, N.J.; Hans F. Zoerb, River Falls, Wis.; Diane R. Rosenwald, Shoreview; Victor T. Huang, Moundsview, both of Minn.

[73] Assignee: The Pillsbury Company, Minneapolis, Minn.

[21] Appl. No.: 472,500

[22] Filed: Jun. 7, 1995

[51] Int. Cl.$^6$ ........................................ A23G 9/00
[52] U.S. Cl. .................. 426/565; 426/100; 426/101; 426/104; 426/139; 426/656; 426/660
[58] Field of Search ...................... 426/565, 656, 426/660, 100, 101, 104, 521, 524, 139

[56] References Cited

U.S. PATENT DOCUMENTS

| | | | |
|---|---|---|---|
| 5,118,792 | 6/1992 | Warren et al. | 530/350 |
| 5,175,013 | 12/1992 | Huang et al. | 426/565 |
| 5,215,777 | 6/1993 | Asher et al. | 426/565 |
| 5,324,751 | 6/1994 | DuRoss | 514/777 |

FOREIGN PATENT DOCUMENTS 9301969  7/1993  European Pat. Off. ........ C12N 15/81

OTHER PUBLICATIONS

Ice Cream, Fourth Edition, by W. S. Arbuckle.
Antifreeze Proteins: Properties, Mechanism of Action, and Possible Applications from Food Technology 1993, vol. 47(1), pp. 82–90.
Antifreeze Proteins, by P.J. Lilliford & C.B. Holt presented at ISOPOW–V, Valencia, Spain, Nov. 1992.

*Primary Examiner*—Esther Kepplinger
*Assistant Examiner*—Lien Tran
*Attorney, Agent, or Firm*—Janal M. Kalis; Aleya Rahman

[57] ABSTRACT

A method for making ice cream for storage. The method does not require a hardening step prior to storage. The method includes preparing a mixture of ingredients that include water and adding an anti-freeze protein to the mixture of ingredients.

4 Claims, 4 Drawing Sheets

SC-10B CONTROL HARDENED 16 HOURS +10°F
DISTRIBUTION OF NUMBER OF CRYSTALS AGAINST EQUIV. CIRCULAR DIAMETER
FIELD NUMBER 2

X MEAN 52.90
X MEDIAN 53.96
X STD DEV 17.84
Y TOTAL 79.00

X MEAN 33.52
X MEDIAN 49.44
X STD DEV 21.71
Y TOTOL 52.00

DISTRIBUTION OF NUMBER OF CRYSTALS AGAINST EQUIV. CIRCULAR DIAMETER
FIELD NUMBER 2

DISTRIBUTION OF NUMBER OF CRYSTALS AGAINST EQUIV. CIRCULAR DIAMETER
FIELD NUMBER 1

X MEAN 26.06
X MEDIAN 25.05
X STDDV 12.17
Y TOTAL 195.0

METHOD OF MAKING ICE CREAM

BACKGROUND OF THE INVENTION

The present invention relates to a method of making a frozen composition utilizing an anti-freeze protein.

Frozen compositions such as ice cream, frozen yogurt, mellorine, sherbets, water ices, milk shakes, sorbets or coated novelty bars and the like, are challenging and energy intensive products to make on an industrial scale. These types of dairy desserts may range in fat content from about 0.01 to 20.0 percent by weight.

Frozen composition manufacturing includes ingredients such as condensed skim milk, cream, sweeteners such as corn sugar, cane sugar, corn syrups and water which are blended together in a vessel and are pasteurized, homogenized and cooled to a temperature of 32° to 42° F. The mix is then stored under agitation at 32° to 40° F.

Liquid flavoring may be added to the pasteurized frozen composition mixture. Particulates such as fruits and nuts may be added during freezing by a device such as a fruit feeder. Once flavored, the mixture is frozen and extruded under air pressure in a scrape-surface heat exchanger for air incorporation and is packaged at about 18° to 25° F.

After being packaged and, in some cases wrapped, the frozen composition is hardened in a hardening tunnel, hardening box, or hardening freezer or in a contact plate freezer at a temperature of –30° F. to –60° F. The hardening process has conventionally been used to freeze remaining unfrozen water in the frozen composition after it has been aerated, agitated and partially frozen.

The hardening step involves quickly freezing the composition to obtain a desired frozen composition mouthfeel. Mouthfeel is affected by the size of ice crystals within the frozen composition. Larger ice crystals impart a grainy mouthfeel. Consequently, rapid freezing results in smaller ice crystals and smoother frozen composition mouthfeel. Without the hardening step, liquid water in frozen composition compositions freezes at much slower rates and forms large ice crystals which impart unacceptably grainy mouthfeel to the frozen composition.

During frozen storage, ice crystal size increases over time as disproportionation occurs and smaller crystals melt and recrystallize onto larger ice crystals in a dynamic process resulting in pronounced iciness, giving the product an undesirable characteristic. Controlling the ice crystal size, whether by formulation, processing, distribution temperature control, or product age management is an objective of all frozen composition manufacturers in order to ensure a high quality finished product.

The Huang et al. reference U.S. Pat. No. 5,175,013, that issued Dec. 29, 1992, describes a frozen composition that includes an ingredient relating to a reduction in ice crystal formation. The ingredient is a high molecular weight starch hydrolysate.

The DuRoss patent U.S. Pat. No. 5,324,751 which issued Jun. 28, 1994, describes microcrystals of sorbitol and mannitol. The sorbitol microcrystals serve as cryoprotectants.

The Warren et al. patent U.S. Pat. No. 5,118,792, which issued Jun. 2, 1992, describes polypeptides that have antifreeze properties.

SUMMARY OF THE INVENTION

Figure 2:
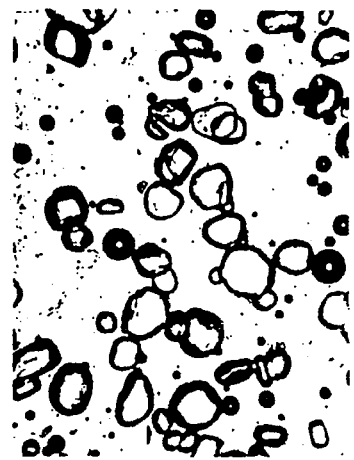
FIG. 2 shows a micrograph of ice crystals in the frozen composition without anti-freeze protein, slowly frozen at 10° F. for 16 hours, then stored at –20° F.

The present invention includes a method for minimizing ice crystal size in a frozen composition that has not been subjected to a hardening step. The method includes combining dessert ingredients that include water to make a mix. An anti-freeze protein is added to the mix. The mix is then pasteurized, homogenized, and frozen at a temperature that is greater than –20° F.

DETAILED DESCRIPTION OF PREFERRED EMBODIMENTS

A method for making a frozen composition of the present invention includes a step whereby anti-freeze protein is added to a mixture of ingredients used to make the frozen composition after which the composition is frozen, without the need for a hardening step prior to storage. Thus, the method of the present invention eliminates a hardening step performed by blast or plate freezing the dessert. The present invention also includes a frozen composition with a water concentration in a range of about 40% to 90% by weight and with an anti-freeze protein in a concentration ranging from about 1 ppm to 100 ppm, preferably less than about 50 ppm, more preferably less than about 20 ppm.

By "cold hardening" or simply "hardening," it is meant that the product is rapidly frozen at a temperature as low as –30 to –60 degrees Fahrenheit. With anti-freeze protein addition, it is not necessary to cold-harden a frozen composition, such as frozen composition, once the dessert has been extruded and packaged. The frozen compositions may slowly harden at temperatures such as 0 to –20 degrees Fahrenheit without being icy. It has been found that ice crystals form in about the same weight percent as are formed in frozen compositions made without the anti-freeze proteins.

Suitable anti-freeze proteins may be derived from blood and muscle tissue of antarctic fish, arctic fish, worms, and insects. Synthetic anti-freeze proteins may be synthesized by genes that are cloned from the aforementioned and inserted into other more ubiquitous types of organisms such as *Escherichia coli* or Saccharomyces species. These organisms are then used to produce the anti-freeze proteins on a commercial scale.

Suitable proteins for use in the method of the present invention include anti-freeze glycoproteins (AFGPs) and anti-freeze peptides(AFPs). The primary structure of AFGPs is a repeating (Ala-Ala-Thr) sequence with galactosyl-N-acetylgalactosamine attached to the threonine residue and with the alanine residues located at the C-terminal end. AFGPs have been labeled with numbers ranging from I to VIII, according to relative electrophoretic migration in gels. AFGPs with numbers ranging from I to V have molecular weights in the 10–30 kDa range and have similar anti-freeze activities. AFGPs labeled with numbers VI to VIII have molecular weights in the 2.6–5 kDa range, and have proline in different positions following a threonine unit.

The AFPs are similar to AFGPs in that alanine is the predominant amino acid residue and the molecules exhibit an amphiphilic character. The remaining residues determine the type and molecular structure. Type I AFPs have $\alpha$-helical structure whereas Type II and III are comprised of $\beta$-sheets or no defined secondary structure. Preferably, a Type I AFP with 55 amino acid residues is employed. The other types of anti-freeze protein are also believed to be effective.

In the method of the present invention, conventional ingredients are provided to make the frozen composition. For instance, in the case of frozen composition, condensed skim milk, cream, corn sugar, cane sugar, corn syrups, gums, emulsifiers, and water are provided in conventional concentrations. The ingredients are blended, pasteurized, and homogenized in a conventional manner known to those skilled in the art. Once pasteurized and homogenized, the mix may be aged at 32° to 40° F.

In one preferred embodiment, the anti-freeze protein is added after pasteurization of the ingredients. The anti-freeze protein may also be added to the mixture before pasteurization.

It is believed that certain characteristics of the frozen composition formula affect the anti-freeze protein. Particularly, it is believed that the pH of the composition may affect the anti-freeze protein activity. Preferably, the pH is such that it does not adversely affect protein activity such as by secondary or tertiary conformational changes or by charge repulsion. It is believed that pH should be greater than about 3 to optimize efficacy of anti-freeze proteins.

Once the frozen composition or other dessert comprising anti-freeze protein is aged, and flavors and solid material such as fruits and nuts are added, the frozen composition may be frozen and packaged at about 18° to 25° F. and stored at a temperature of about −10° to 20° F. With the anti-freeze protein, it is not necessary to harden the frozen composition at a temperature of about −30° to −60° F. Ice cream or other frozen products may be stored at a temperature as high as about 10° F., bypassing the cold hardening process, when these products contain the anti-freeze protein.

In one preferred embodiment a concentration of anti-freeze protein of about 10 ppm, parts per million, is added to a frozen composition mixture such as frozen composition. However, concentrations as low as about 1–5 parts per million are effective in eliminating the need for a hardening step.

Frozen compositions, such as frozen composition, containing anti-freeze protein, but manufactured without the cold hardening step, have ice crystals of a size comparable to ice crystals in similar product without anti-freeze protein, but manufactured with a hardening step. Specific examples of frozen compositions made with and without the anti-freeze protein are presented herein. The examples are presented to describe particular product features and not to limit the process or product of the present invention

EXAMPLE 1

In one embodiment, an ice cream with 17 percent by weight fat is made from the following ingredients:

| Ingredient | Weight % |
| --- | --- |
| Condensed skim milk | 24 |
| Cream, 40% fat | 43 |
| Egg yolk, with sugar | 5 |
| Sucrose | 13 |
| Water | 14 |
| Vanilla | 1 |

Figure 1:
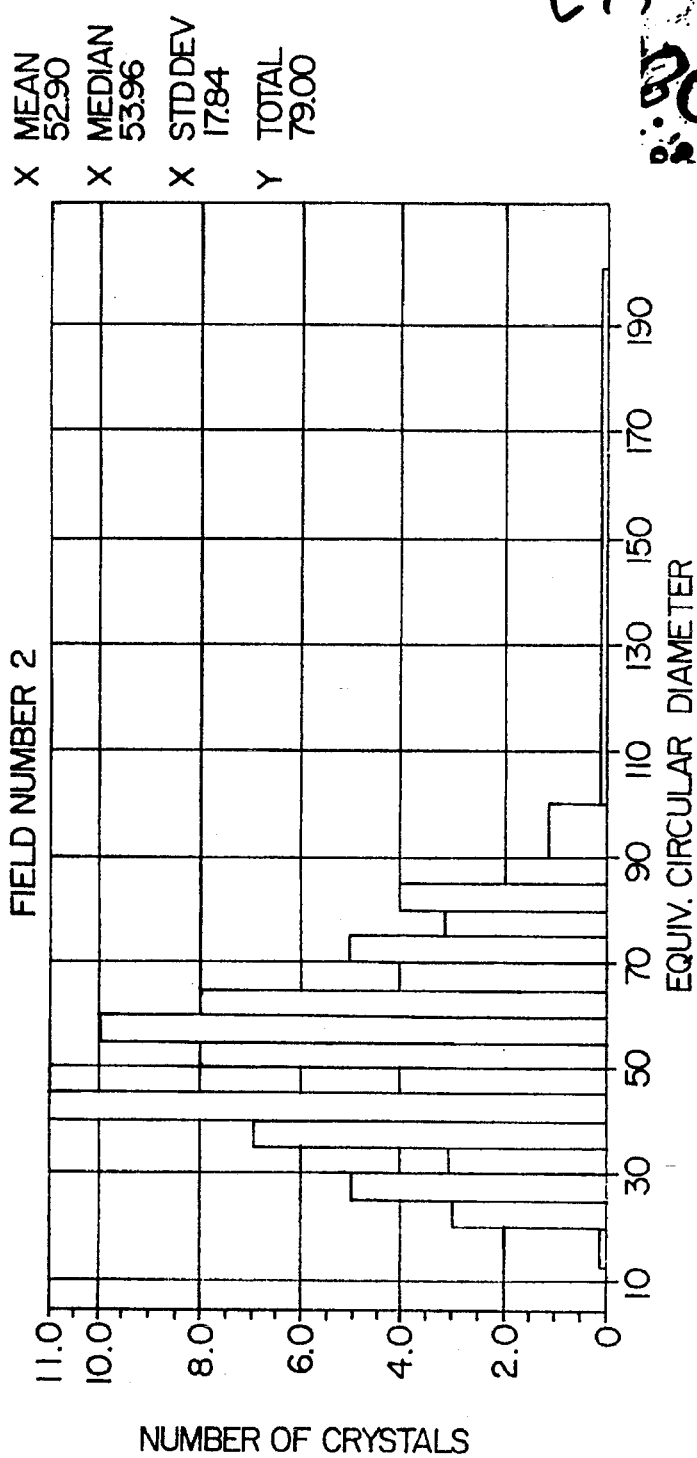
FIG. 1 shows the ice crystal size distribution in an frozen composition without anti-freeze protein, slowly frozen at 10° F. for 16 hours, then stored at –20° F.

Ice cream from these ingredients was manufactured by conventional means, but excluding the hardening step, and stored at about 10° F. After 16 hours at 10° F., the average ice crystal size was about 54 microns (FIGS. 1 and 2). Methods for ice crystal size determination are described in Example 3.

Figure 3:
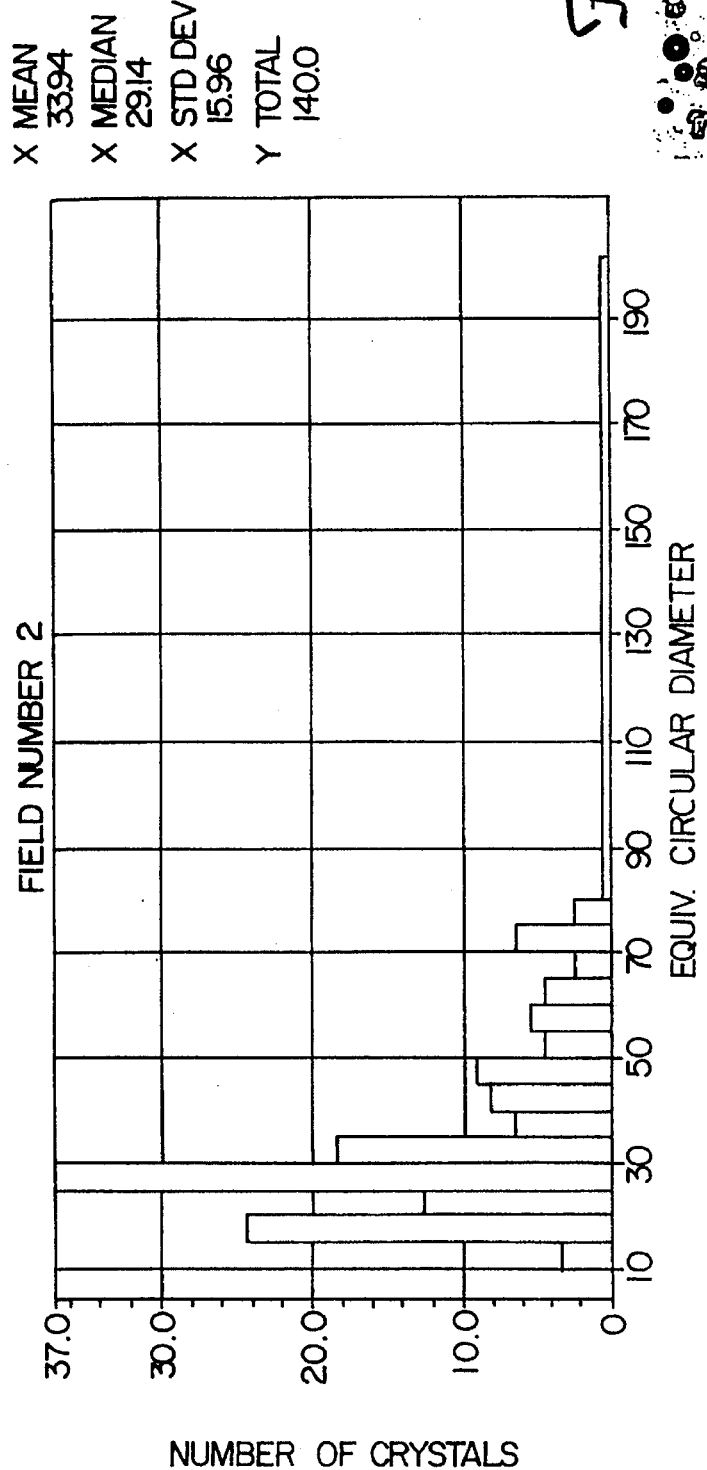
FIG. 3 shows the ice crystal size distribution in an frozen composition with 10 ppm anti-freeze protein, slowly frozen at 10° F. for 16 hours, then stored at –20° F.
Figure 4:
FIG. 4 shows a micrograph of ice crystals in an frozen composition with 10 ppm anti-freeze protein, slowly frozen at 10° F. for 16 hours, then stored at –20° F.

Ice cream from the same mix processed and stored under identical conditions but with anti-freeze protein added to reach a concentration of about 10 ppm had a mean ice crystal size of about 34 microns (FIGS. 3 and 4). This ice crystal size is typical of ice crystals found in conventional frozen compositions manufactured with a hardening process and stored at about −20° F.

EXAMPLE 2

In another embodiment, frozen yogurt was made from the following ingredients:

| Ingredient | Weight % |
| --- | --- |
| Condensed skim milk | 12.00 |
| Ultrafiltered skim milk, 22.3% total solids | 33.00 |
| Cream, 40% by wt. | 7.00 |
| Egg yolk, with sugar | 4.00 |
| Sucrose | 13.00 |
| 26 DE corn syrup | 11.00 |
| Water | 7.00 |
| Vanilla | 1.00 |
| Yogurt, 20% total solids | 12.00 |

Figure 6:
FIG. 6 shows a micrograph of ice crystals in a frozen yogurt without anti-freeze protein that has been hardened at –40° F. and stressed at 20° F. for 4 days.
Figure 5:
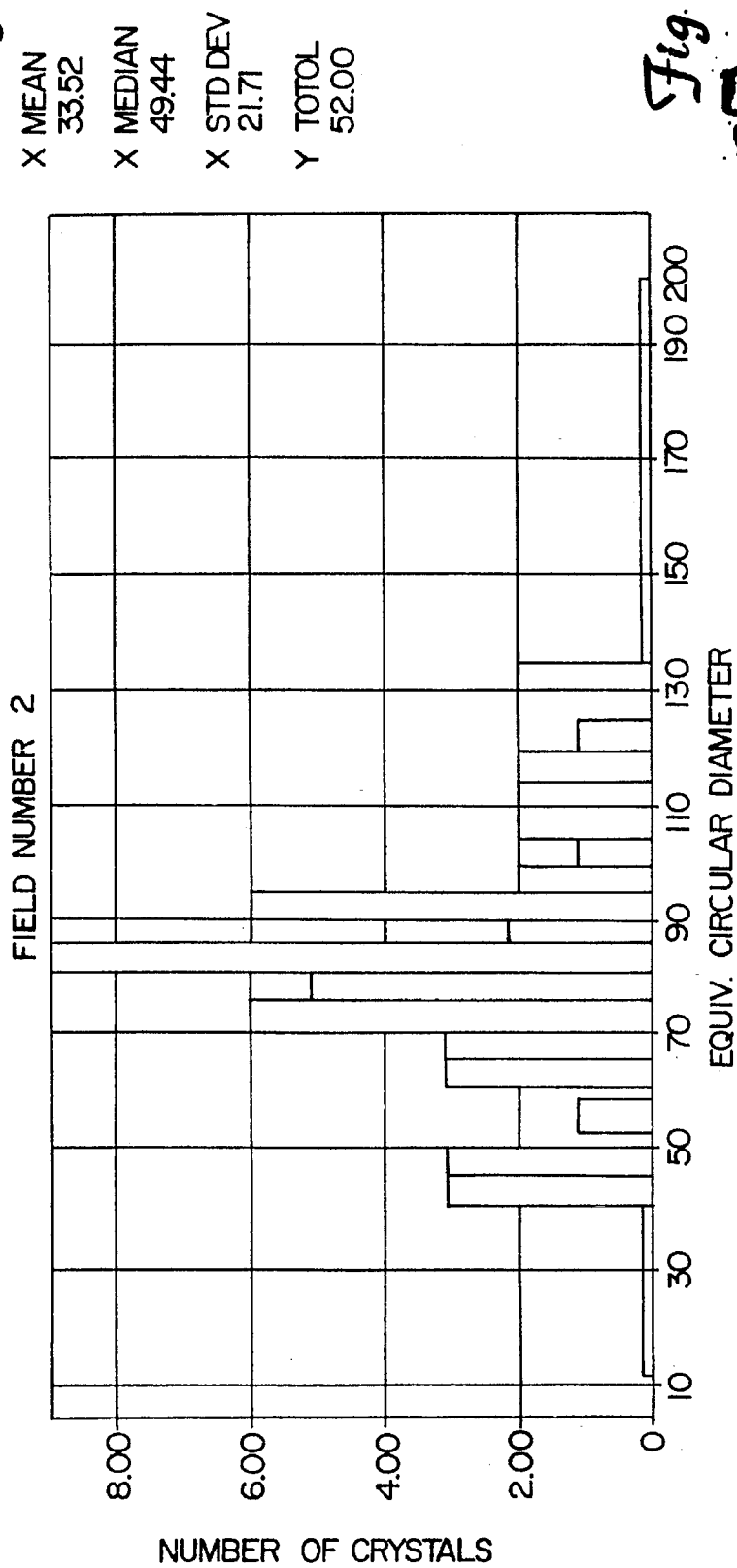
FIG. 5 shows the ice crystal size distribution in a frozen yogurt without anti-freeze protein that has been hardened at –40° F. and stressed at 20° F. for 4 days.

Yogurt made with the ingredients described above was manufactured conventionally, including hardening by blast freezing, but then stressed for 4 days at 20° F. prior to analysis. Ice crystals reached a mean size of about 89 microns (FIGS. 5 and 6).

Figure 8:
FIG. 8 shows a micrograph of ice crystals in a frozen yogurt with 10 ppm anti-freeze protein that has been slowly frozen at 10° F. for 16 hours, stored at –20° F., then stressed at 20° F. for 4 days.
Figure 7:
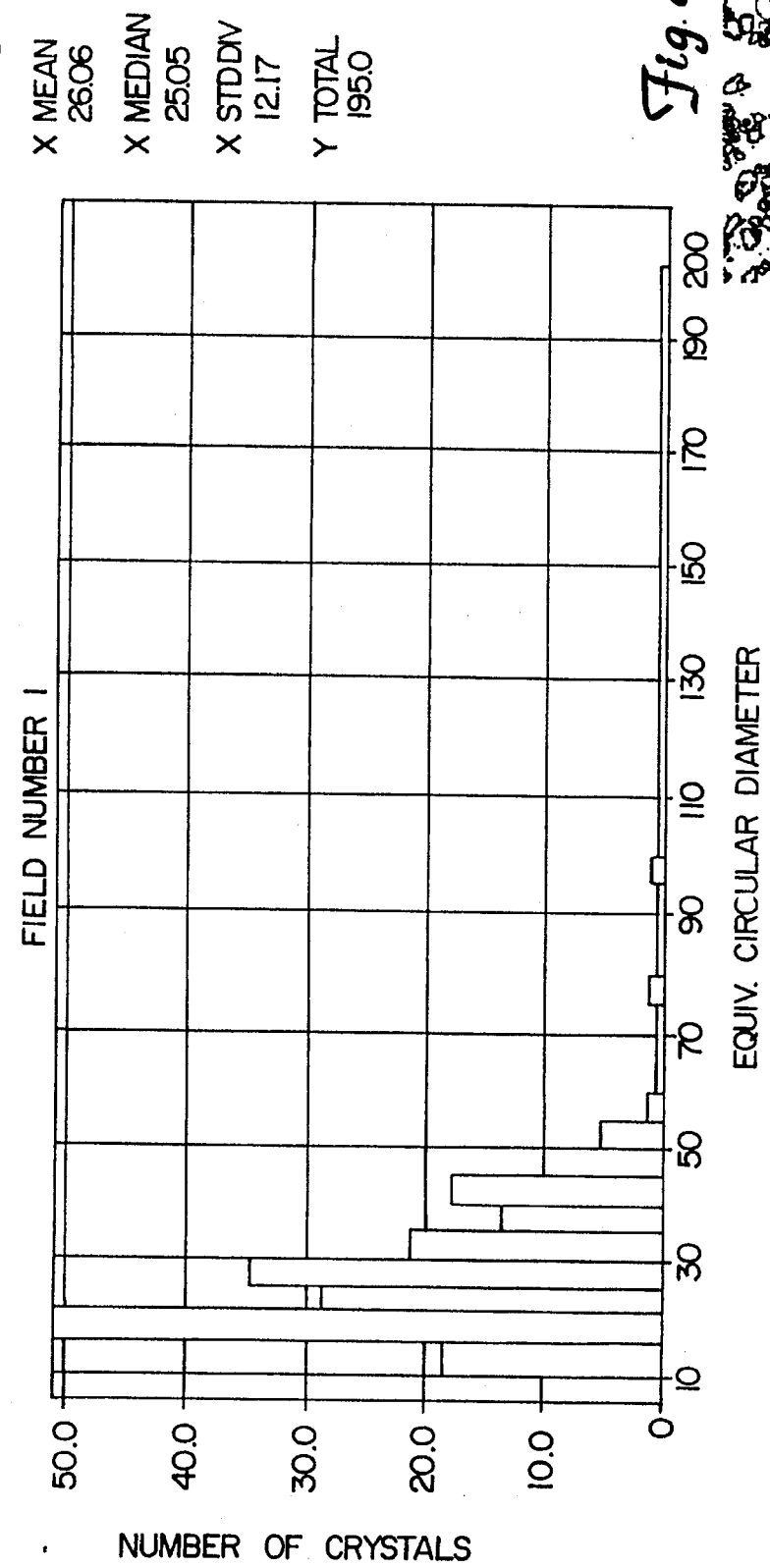
FIG. 7 shows the ice crystal size distribution in a frozen yogurt with 10 ppm anti-freeze protein that has been slowly frozen at 10° F. for 16 hours, stored at –20° F., then stressed at 20° F. for 4 days.

Ice crystals in yogurt made from the same batch but with anti-freeze protein added to reach a concentration of 10 ppm without hardening averaged 27 microns in size when stored under stress conditions identical to the yogurt without AFGP (FIGS. 7 and 8). The smaller ice crystals in the anti-freeze protein treated yogurt resulted in a smoother texture and mouthfeel than that in the yogurt without AFP.

EXAMPLE 3

Ice crystal analysis was performed by a test method designed to measure ice crystals less than 100 microns. Equipment required to perform the test included a Zeiss microscope, manufactured by Carl Zeiss, Inc., of Thornwood, N.Y., equipped with a temperature controlled cold stage, manufactured by Mettler Instrument Corp. of Hightstown, N.J. A thermoelectric stage is preferred. Frozen composition samples were equilibrated to −20 Centigrade. Colder samples are undesirable because they can fracture. Slides, coverslips, mineral oil and utensils are also equilibrated to −20 Centigrade.

Frozen composition samples were collected from frozen pints of dessert. Samples were removed from the center of the container 1 inch below the dessert surface.

In a freezer chamber at −20 C., a small amount of the sample was placed on the cold microscope slide with a cold spatula. A drop of mineral oil was placed over the sample and a coverslip was placed over the mineral oil. The dessert sample was dispersed into the oil by applying pressure on the coverslip with a cold pencil eraser.

The microscope and stage were cooled with liquid nitrogen. The apparatus was enclosed in a plastic bag to prevent moisture from freezing on the lenses of the microscope or the sample slide. The magnification was determined as follows:

| | |
|---|---|
| Magnification | 10× |
| Objective | 16× |
| Camera Eyepiece | 0.8× |
| Camera Factor Theoretical | 128× |
| Actual | 130.7× |

Once the stage was equilibrated to −20 Centigrade, the slide was quickly transferred from the freezer to the microscope stage. The sample was examined for a field showing a representative distribution of ice crystals. Areas where ice crystals were evenly dispersed and separated were easier to analyze by image analysis or digitizing. Samples and analyses were run in duplicate.

Distributions for equivalent circular diameter were determined by image analysis of the photographs. An automated program was used to detect and measure each ice crystal in the field. The image analysis field was slightly smaller than the photograph. Overlapping ice crystals could not be measured by this method. The image analyzer measured the outside edge of contrasting rings which define the ice crystals. Quality control checks included a magnification check, calibration check, accuracy check and a precision check.

Although the present invention has been described with reference to preferred embodiment, workers skilled in the art will recognize that changes may be made in form and detail without departing from the spirit of the invention.

What is claimed is:

1. A method for preparing ice cream, the method comprising:

preparing a composition of ingredients that includes water;

adding an anti-freeze protein to the composition of ingredients;

cooling the composition containing the anti-freeze protein to a temperature no colder than about −30 degrees Fahrenheit prior to storage; and storing the composition after cooling at a temperature warmer than about −30 degrees Fahrenheit and cool enough to freeze the composition, including the water;

wherein the composition does not require a cold hardening step at a temperature cooler than about −30 degrees Fahrenheit prior to storage to minimize ice crystal size in the composition.

2. The method of claim 1 and further including adding the anti-freeze protein in a concentration of not more than about twenty parts per million.

3. The method of claim 1 and further including pasteurizing the composition prior to addition of the anti-freeze protein.

4. The method of claim 1 and further including pasteurizing the composition after addition of the anti-freeze protein.

* * * * *

UNITED STATES PATENT AND TRADEMARK OFFICE
CERTIFICATE OF CORRECTION

PATENT NO. : 5,620,732
DATED : April 15, 1997
INVENTOR(S) : John F. Clemmings, et al.

It is certified that error appears in the above-indentified patent and that said Letters Patent is hereby corrected as shown below:

Col. 3, line 49, after the word "-10° to" the number should be a negative number "-20°" not "20°".

Col. 1, line 7, after the word "mellorine," the correct word is --sherberts--.

Col. 1, line 65, after the words "distribution in" the correct word should be --a--.

Col. 2, line 4, after the words "distribution in" the correct word should be --a--.

Col 2, line 7, after the words "distribution in" the correct word should be --a--.

Signed and Sealed this

Twelfth Day of August, 1997

Attest:

BRUCE LEHMAN

Attesting Officer

Commissioner of Patents and Trademarks